(12) United States Patent
Nourdine et al.

(10) Patent No.: US 8,186,394 B2
(45) Date of Patent: May 29, 2012

(54) DEVICE FOR AVOIDING ERRORS IN DELIVERING FLUID TO A CONTAINER

(75) Inventors: Amir Nourdine, Cluses (FR); Jean-Luc Breheret, Mieussy (FR)

(73) Assignee: G. Cartier Technologies, Cluses (FR)

( * ) Notice: Subject to any disclaimer, the term of this patent is extended or adjusted under 35 U.S.C. 154(b) by 1094 days.

(21) Appl. No.: 12/059,364

(22) Filed: Mar. 31, 2008

(65) Prior Publication Data

US 2008/0236685 A1  Oct. 2, 2008

(30) Foreign Application Priority Data

Mar. 31, 2007 (FR) ........................... 07 54197
Oct. 9, 2007 (FR) ........................... 07 58177
Mar. 18, 2008 (FR) ........................... 08 51755

(51) Int. Cl.
*B60K 15/04* (2006.01)
(52) U.S. Cl. .......... 141/348; 141/94; 141/350; 220/86.2
(58) Field of Classification Search .................... 141/94, 141/348–350; 220/86.2
See application file for complete search history.

(56) References Cited

U.S. PATENT DOCUMENTS

| | | | | |
|---|---|---|---|---|
| 3,148,713 A * | 9/1964 | Jones, Jr. | .................... | 141/346 |
| 5,857,501 A | 1/1999 | Kelerich et al. | | |
| 6,209,592 B1 | 4/2001 | Gilboa et al. | | |
| 6,230,739 B1 * | 5/2001 | Gericke | .................... | 141/349 |
| 6,302,169 B1 * | 10/2001 | Pulos | .................... | 141/301 |
| 6,382,270 B1 | 5/2002 | Gzik | | |
| 6,966,349 B1 * | 11/2005 | Laduke | .................... | 141/367 |
| 6,990,945 B1 * | 1/2006 | Kropinski et al. | .................... | 123/198 D |
| 7,077,178 B2 * | 7/2006 | Hedevang | .................... | 141/367 |
| 7,182,111 B2 * | 2/2007 | McClung et al. | .................... | 141/352 |
| 7,293,586 B2 * | 11/2007 | Groom et al. | .................... | 141/350 |
| 7,302,977 B2 * | 12/2007 | King et al. | .................... | 141/367 |
| 7,665,493 B2 * | 2/2010 | Groom et al. | .................... | 141/350 |
| 7,789,113 B2 * | 9/2010 | Stephan et al. | .................... | 141/350 |
| 7,950,425 B2 * | 5/2011 | Och | .................... | 141/367 |

(Continued)

FOREIGN PATENT DOCUMENTS

DE  36 41 274  6/1987

(Continued)

OTHER PUBLICATIONS

French Search Report of FR 0754197 completed Nov. 26, 2007.

(Continued)

*Primary Examiner* — Gregory Huson
*Assistant Examiner* — Nicolas A Arnett
(74) *Attorney, Agent, or Firm* — RatnerPrestia

(57) ABSTRACT

Device for avoiding fluid delivery errors, comprising a primary coil (6), placed in a container (1) in the vicinity of a fluid delivery orifice (2) of the container, a control and measurement electric circuit (7) supplying power to the primary coil (6) to generate electromagnetic waves in the fluid delivery orifice (2), detector means (7, 8) sensitive to the waveform of the currents or voltages that appear in the primary coil (6) and that distinguish the presence and the type of fluid delivery nozzle (4) as a function of said waveform of the currents or voltages in the primary coil (6). Comparator means (11) determine if the measured oscillation frequency ($f_m$) is different from a reference oscillation frequency ($f_r$). If necessary, the user is warned, by alarm means (12), that he is about to fill his container (1) with the wrong type of fluid.

22 Claims, 9 Drawing Sheets

U.S. PATENT DOCUMENTS 7,967,041 B2 * 6/2011 Groom et al. ................ 141/367
7,967,042 B2 * 6/2011 Groom et al. ................ 141/367

FOREIGN PATENT DOCUMENTS

| DE | 196 39 825 | 4/1997 |
| DE | 101 57 090 | 4/2003 |
| EP | 1 199 208 | 4/2002 |
| EP | 1 264 726 | 12/2002 |
| WO | WO 99/58356 | 11/1999 |

OTHER PUBLICATIONS

English Language Search Report.

* cited by examiner

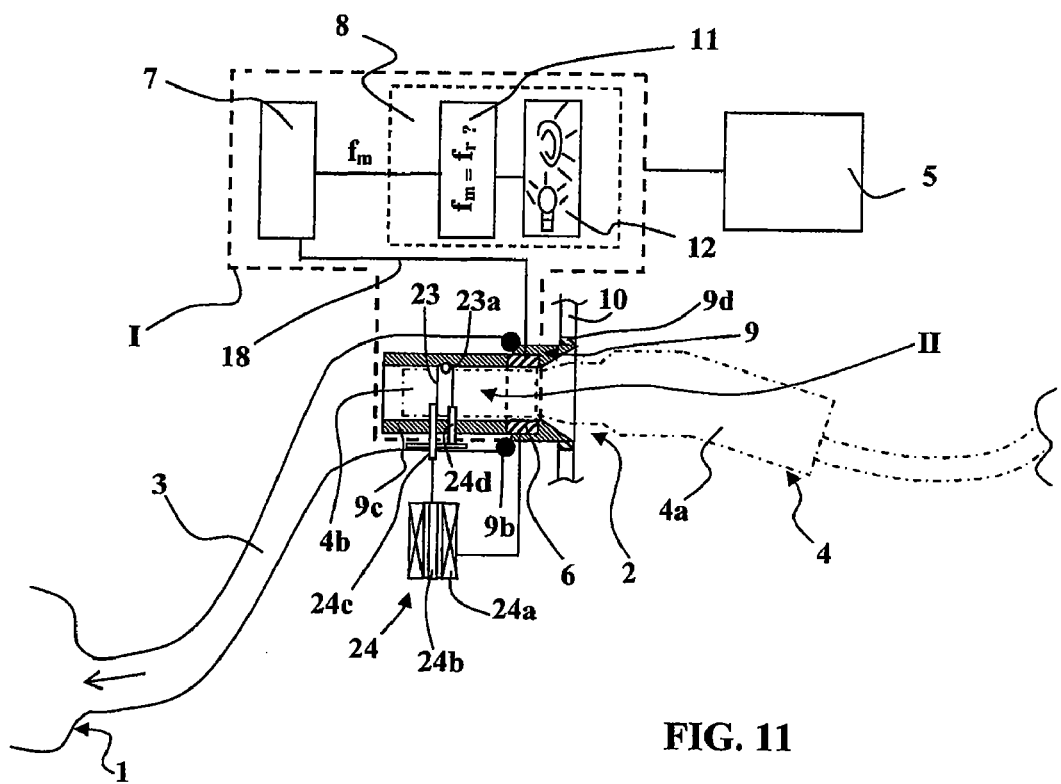
FIG. 11
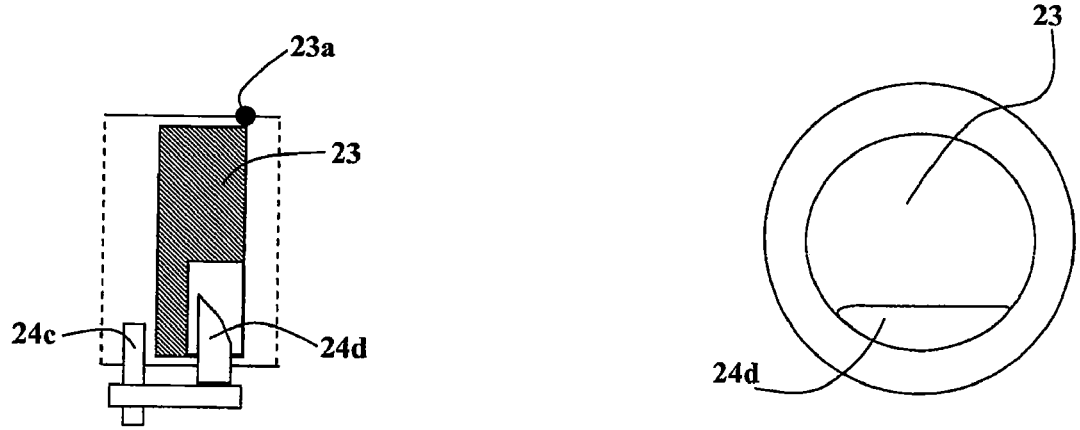
FIG. 12
FIG. 13

DEVICE FOR AVOIDING ERRORS IN DELIVERING FLUID TO A CONTAINER

TECHNICAL FIELD OF THE INVENTION

The present invention concerns delivery control devices for preventing errors in delivering fluid into a fluid container.

The invention applies particularly, although not exclusively, to fuelling vehicles.

Modern vehicles mainly use two types of fuel, petrol and diesel.

Each vehicle user must regularly fill the fuel tank of their vehicle with the appropriate type of fuel, i.e. with petrol for a vehicle whose engine runs on petrol or with diesel for a diesel engine vehicle.

The tank is filled by means of a fuel delivery nozzle connected to a fuel distribution pump by a flexible hose. Each fuel delivery nozzle comprises a handle with a trigger extended by a metal outlet tube designed to enter the inlet orifice of the tank of the vehicle to introduce fuel into it.

Sometimes users put the wrong type of fuel in their vehicle. It is easy to make this mistake, especially as there are usually several delivery nozzles for different fuels on each fuel distribution pump, and the delivery nozzles are similar.

The problem is that new generations of direct injection engines (petrol or diesel) are intolerant of fuelling errors. There is also the problem that engines adapted to use unleaded petrol, and most importantly their catalytic converters, are intolerant of fuelling them with diesel or leaded petrol.

A first simple way to prevent these mistakes was to design petrol delivery nozzles with outlet tubes of smaller diameters than diesel delivery nozzle outlet tubes.

Accordingly, petrol delivery nozzles have a tube with a standard outside diameter of 21 mm and an inside diameter of 16.8 mm, while diesel delivery nozzles have a tube with a standardized outside diameter of 24.6 mm and an inside diameter of 19.8 mm.

Given this difference between the outside diameters of the two types of delivery nozzle outlet tube, vehicle manufacturers have proposed to adapt the diameters of the fuel inlet orifices accordingly, by attaching to the end of the fuel pipe a guide whose inside diameter is slightly greater than the diameter of the outlet tube of the appropriate delivery nozzle, as described in the documents DE 196 39 825 and DE 3641274. Accordingly, the inside diameter of the guide of a petrol vehicle is smaller than that of the guide of a diesel vehicle and prevents insertion of a diesel delivery nozzle.

The dimensions therefore prevent a user inserting a diesel delivery nozzle into the inlet orifice with guide of a petrol vehicle.

However, an inattentive user can easily insert a petrol delivery nozzle into the inlet orifice of a diesel vehicle.

Thus this first simple way to prevent fuelling errors eliminates only some of the risks, and therefore is not sufficiently reliable.

The same problems can arise in devices for delivering specific fluids to diverse containers if fluid delivery nozzles having different structures are employed for distributing different specific fluids.

More recently, guides have been proposed fitted with mechanical locking means adapted to prohibit the insertion of a petrol delivery nozzle outlet tube of smaller diameter but allowing the insertion of a diesel delivery nozzle outlet tube. Descriptions of these systems can be found in the documents EP 1 199 208, DE 101 57 090, EP 1 264 726 and U.S. Pat. No. 6,382,270, for example.

In all cases, mechanical means palpate the end of the delivery nozzle outlet tube to assess its diameter and to prohibit or authorize its insertion into the guide.

These mechanical control systems have serious drawbacks, however, which make their use inappropriate.

In particular, the mechanical means for palpating the diameter of the delivery nozzle outlet tube inevitably come into contact with the outlet tube and can therefore easily be damaged by mechanical impacts. Damage to the mechanical means has the risk of totally preventing access to the tank, and thus of immobilizing the vehicle.

Furthermore, the mechanical means described do not allow the user to fill the tank using non-standard means such as a jerrycan or a bottle.

Also, once damaged by impact or mechanical forces, the mechanical means cannot detect and differentiate reliably delivery nozzle outlet tubes with relatively similar diameters, for example petrol and diesel delivery nozzle outlet tubes.

The documents U.S. Pat. No. 5,857,501 and WO 99/58356 propose electronic solutions with coils on the vehicles and with coils, electrical power supply circuits and processing circuits integrated into the fluid pumps and delivery nozzles. It is then necessary to modify further the pumps and delivery nozzles to integrate the coils and the power supply and processing circuits.

SUMMARY OF THE INVENTION

The problem addressed by the present invention is to design a simple delivery control device that requires no structural modification of the fuelling pumps and fluid delivery nozzles and detects automatically and reliably the type of fluid that a user is about to introduce into the container.

Another aspect of the invention aims to design an "intelligent" container that warns users when they are about to introduce the wrong type of fluid into the container and/or prevents physical penetration of the outlet tube of an inappropriate fluid delivery source and/or prevents the flow of an inappropriate fluid into the container.

To achieve the above and other objects, the invention proposes a delivery control device for preventing errors in the choice of the fluid when delivering fluid to a container by means of a fluid delivery nozzle, which nozzle having an outlet tube that is introduced into a fluid delivery orifice of the container, the structure of the outlet tube being a specific function of the fluid delivered; this kind of delivery control device comprises:
- a primary coil, fixed to the container in the vicinity of the fluid delivery orifice so that the outlet tube of the fluid delivery nozzle passes through it on its introduction into the fluid delivery orifice,
- a control and measurement electric circuit adapted to supply the primary coil with power so as to generate electromagnetic waves in the space inside the primary coil,
- detector means sensitive to the waveform of the currents or voltages that appear in the primary coil that distinguish the presence and the type of fluid delivery nozzle as a function of said waveform of the currents or voltages in the primary coil.

This device is simple and fitting it does not necessitate modification of the structure of the fluid delivery nozzles or of any other component of the fluid delivery pumps. It is simply fitted to the inlet orifice of the fluid container.

Because this modification relates only to an area situated in the vicinity of a fluid inlet orifice of the container, which is easily accessible, the device of the invention can be used either on new containers or on old containers.

Moreover, vehicle manufacturers can install the device of the invention in the guides by a simple adaptation of existing vehicle production lines, without redesigning them.

This delivery control device therefore reliably distinguishes between the main types of outlet tubes of fuel delivery nozzles used at present for internal combustion engine terrestrial vehicles, in particular the outlet tubes of diesel and petrol delivery nozzles.

Moreover, the delivery control device necessitates no mechanical contact with the outlet tube of the delivery nozzle. There is therefore no risk of damaging the detector device by mechanical impact during inevitable sudden maneuvers of fuel delivery nozzles.

The device can advantageously comprise a capacitor connected in parallel with the primary coil, this combination being connected in series with an excitation switch to be supplied with power by a DC generator.

The resulting circuit is an RLC resonant circuit. The circuit is known to have a resonant frequency $f_r=(L_1 C)^{-1/2}$, where $L_1$ is the apparent inductance of the primary coil and C is the capacitance of the capacitor.

When the excitation switch is closed, the capacitor is charged to the voltage of the DC generator. On opening the excitation switch, the resonant circuit oscillates at the resonant frequency $f_r$ and the amplitude of this oscillation decreases exponentially with time because of the inherent resistance R of the circuit.

The metal outlet tube of a fluid delivery nozzle placed in the fluid inlet orifice of the container in the vicinity of the primary coil constitutes an inductive and resistive secondary electrical circuit. Its presence modifies the inductance seen by the primary electric circuit and therefore modifies the resonant frequency $f_r$. Its diameter also modifies the inductance and the resonant frequency $f_r$.

When the outlet tube of the fuel delivery nozzle is introduced into the fuel tank via the fuel inlet orifice, currents are induced in the outlet tube of the fuel delivery nozzle because of the magnetic induction effect created by the oscillatory current flowing in the primary coil. These induced currents create a magnetic field that influences the primary coil. This varies the equivalent inductance of the primary circuit. The oscillation frequency of the primary electric circuit then becomes $f_m=(L'*C)^{-1/2}$, where L' is the equivalent inductance of the primary coil as influenced by the outlet tube of the fuel delivery nozzle. This oscillation frequency $f_m$ can be measured by oscillation frequency measuring means.

Trials on fuelling systems for diesel and petrol vehicles have shown that the outlet tubes have sufficiently different structures to induce detectable modifications in the resonant frequency, enabling certain differentiation of the types of fuel delivery nozzle. This is why measuring the frequency is a judicious, simple and effective choice.

It must be reminded that the outlet tubes of fuel delivery nozzles are conventionally of metal, which explains their action on the resonant frequency $f_r$.

The type of fluid delivery nozzle is therefore determined by the control and measurement electric circuit measuring the influence of the secondary circuit consisting of the outlet tube of the fluid delivery nozzle.

The control and measurement electric circuit can advantageously comprise a negative resistance connected in series with the primary coil to the terminals of the capacitor.

So placed, the negative resistance reduces the inevitable damping of the RLC resonant circuit. The resonant circuit therefore continues to oscillate for a longer time period, enabling more accurate measurement of the frequency $f_r$.

The control and measurement circuit is advantageously adapted to measure the oscillation frequency of the voltage at the terminals of the primary coil after opening of the excitation switch, to produce a measured frequency signal $f_m$. This reduces the influence of the inherent impedance of the power supply circuit on the frequency $f_r$, consequently increasing the influence of the resistance of just the outlet tube of the delivery nozzle to be distinguished. This facilitates detection.

For each type of fluid delivery nozzle, there may be envisaged the storage in memory in the electric circuit of a reference frequency value $f_r$ corresponding to the oscillation frequency of the resonant circuit when influenced by the relevant secondary circuit (petrol delivery nozzle for a petrol vehicle, diesel delivery nozzle for a diesel vehicle, appropriate delivery nozzle for the required fluid).

The detection means can therefore preferably comprise:
  comparator means for receiving the measured frequency signal and for comparing the measured frequency signal with a reference frequency signal specific to the type of fluid delivery nozzle adapted to deliver the fluid that is suitable for the container and to produce an error signal in the event of a significant difference between the measured frequency signal and the reference frequency signal,
  alarm means for attracting the attention of the user to the presence of an error signal.

The device of the invention can comprise simple means for detecting a difference between the reference frequency $f_r$ and the measured frequency $f_m$. If $f_m$ and $f_r$ are not equal, the user is warned that he has inserted the wrong fluid delivery nozzle into the fluid tank orifice. The effect of this will be to enable the user to remove the fluid delivery nozzle before any significant quantity of the wrong type of fluid has been put into the container.

The warning means can advantageously emit a sound or light signal perceptible by the user.

Thus the user will not have to move to be warned of his mistake.

According to the invention, the device can comprise an input switch connected in series in the power supply of the primary electric circuit and adapted to be switched to supply the device with power as a function of the position of an external member, such as an access flap to the fluid inlet orifice.

To fill a container such as a vehicle tank, the first action is to open the flap of the container (of the fuel tank). The primary electric circuit is then supplied with power by the DC generator (such as the battery of the vehicle). Once the flap is closed, the supply of power is interrupted and this prevents discharging the battery.

As a result, operation is authorized only at appropriate times in filling the container with fluid (only when the flap is open).

In practice a REED switch can be used as the input switch, for example.

In another embodiment, the delivery control device as defined hereinafter comprises a locking device positioned downstream of the primary coil and adapted selectively to oppose movement of the outlet tube toward the container and/or flow of the fluid toward the container. The action of the device is then positive, and its efficacy no longer depends on the good intentions of the user.

In practice, the locking device can comprise:
  a blocking valve adapted selectively to assume a blocking state in which it blocks access to the container and a release state, a locking actuator driven by the control and measurement electric circuit, acted on by return means and adapted to assume a locked state or an unlocked state, the locking actuator holding the blocking valve in the blocking state when it is itself in the locked state and allowing the blocking valve to assume the release state when it is itself in the unlocked state.

Another aspect of the invention provides a vehicle that can comprise a device as defined hereinabove at the inlet orifice of its fuel tank.

Thus the vehicle of the invention will be "protected" against any fuelling mistake by the user.

The inlet orifice of the fuel tank of the vehicle can advantageously comprise a guide for guiding the outlet tube of the fuel delivery nozzle.

The guide guarantees relatively precise positioning of the outlet tube of the fuel delivery nozzle relative to the primary coil. This position determines the coupling between the secondary electric circuit (outlet tube) and the primary electric circuit (resonant circuit). This makes detection of the type of fuel delivery nozzle even more precise.

In a first embodiment, suitable for application of the invention to new vehicles, the guide comprises:

an annular guide body connected in sealed manner in an annular connection area to the end of a fuel pipe of the tank and shaped to receive and guide the outlet tube of the fuel delivery nozzle, a guide tube coaxially extending the guide body in the fuel pipe of the tank and also shaped to receive and guide the outlet tube of the fuel delivery nozzle, sealing means between the guide body and the adjacent bodywork of the vehicle.

The primary coil is preferably oriented coaxially and overmolded with a plastic material in or on the wall of the guide tube, and is supplied with power from the control and measurement electric circuit by electric conductors embedded in the plastic material in or on the wall of the guide tube and that exit the guide radially in the section thereof situated between the annular connection area and the sealing means.

According to the invention, means can also be provided for detecting the presence and the absence of a cap blocking the inlet orifice. For this purpose, a capacitor is connected in parallel with the primary coil, the combination being connected in series with an excitation switch to be supplied with power by a DC generator; the capacitor is itself connected in series with a test switch; a secondary resonant circuit is provided in a cap for blocking the inlet orifice; and the control and measurement circuit contains a sequence for verifying the presence of the cap during which the test switch is open and commands closing and then opening of the excitation switch and then reception and analysis of the voltage signal at the measurement point and generation of a cap presence indicating signal in the case of reception of an oscillatory signal and the generation of a cap absence indicating signal in the case of reception of a non-oscillatory signal.

In a second embodiment, suitable for application of the invention to finished vehicles, in which the guide is already attached to the inlet tube and can no longer be extracted without damage, the primary coil is oriented coaxially and engaged inside the guide tube whilst leaving sufficient space for passage of the outlet tube of the fuel delivery nozzle, and the primary coil is supplied with power from the control and measurement electric circuit via a receiver coil connected in series with the primary coil, housed with a radial orientation inside the guide tube and magnetically coupled to a sender coil connected to the control and measurement electric circuit and housed outside the plastic material inlet pipe, the primary coil and the receiver coil forming a tubular assembly embedded in a plastic material.

BRIEF DESCRIPTION OF THE DRAWINGS

Other objects, features and advantages of the present invention will emerge from the following description of particular embodiments given with reference to the appended figures, in which:

FIG. 11 represents a variant of the FIG. 10 device, with emergency unlocking means;

FIG. 12 is a diagram to a larger scale showing one possible structure of the emergency unlocking means;

FIG. 13 is a front view of the emergency unlocking means from FIG. 12;

DESCRIPTION OF THE PREFERRED EMBODIMENTS

Figure 1:
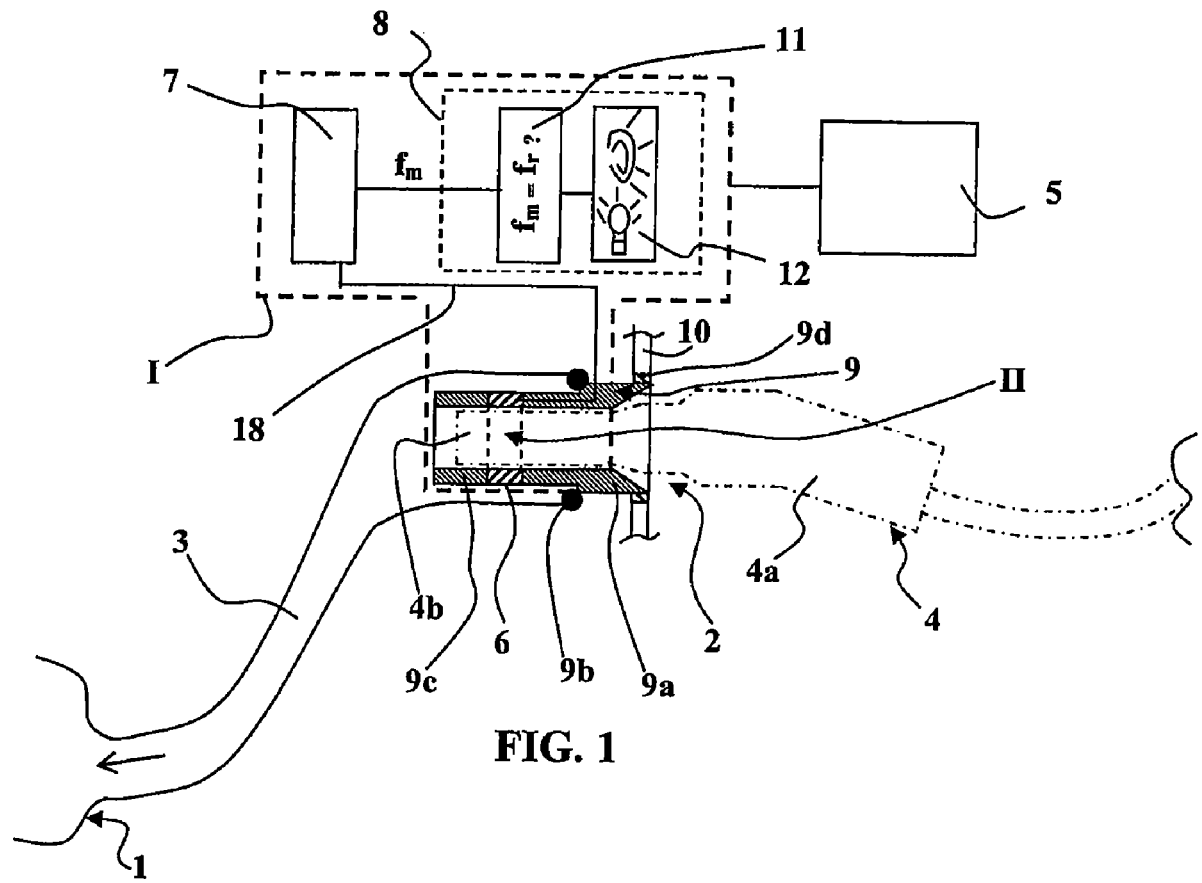
FIG. 1 is an overall view of one particular embodiment of the delivery control device of the invention.

FIG. 1 represents essential components of a delivery control device according to one embodiment of the invention.

A container 1, for example the tank of a vehicle, is a cavity adapted to contain a fluid such as fuel that is delivered to the engine of the vehicle. This container 1 has an inlet orifice 2 and an inlet pipe 3 that connects the inlet orifice 2 to the main body of the container 1.

A fluid delivery nozzle 4 has a handle 4a with an operating lever and a metal outlet pipe 4b adapted to be inserted by the user into the inlet orifice 2 of the container 1.

In the vicinity of the inlet orifice 2 is a primary circuit I supplied with power by a voltage generator 5. This primary circuit I comprises a primary coil 6 with a capacitor connected in parallel, forming a resonant circuit, a control and measurement electric circuit 7, and detector means 8. The primary coil 6 can be a helically wound electrical conductor placed coaxially in the inlet pipe 3. The shunt capacitor can be integrated into the coil in order to reduce the inherent resistance of the resonant circuit. Alternatively, especially if the system must be recalibrated, the shunt capacitor can be in the control and measurement electric circuit 7.

In the particular case of a vehicle tank type container, the inlet orifice 2 is formed in a guide 9 attached to the inlet end of the inlet pipe 3. The guide 9 comprises an annular guide body 9a connected and sealed in an annular connection area 9b to the end of the inlet pipe 3 and comprises a guide tube 9c that coaxially extends the guide body 9a into the inlet pipe 3.

The annular guide body 9a and the guide tube 9c are both shaped to receive and guide the outlet tube 4b of the fluid delivery nozzle 4.

Sealing means 9d such as an O-ring are provided to make a seal between the lateral face of the guide body 9a and the bodywork 10 of the vehicle.

In the embodiment shown in FIG. 1, the primary coil 6 is oriented coaxially and molded into the wall of the guide tube 9c.

The primary coil 6 is supplied with power from the control and measurement electronic circuit 7 by electric conductors 18 embedded in the wall of the guide tube 4b and that exit the guide 9 radially in the section thereof situated between the annular connection area 9b and the sealing means 9d. This avoids having electric conductors in contact with the atmosphere inside the inlet pipe 3 or the container 1.

The detector means 8 comprise comparator means 11 and alarm means 12. The alarm means 12 can emit an sound or light signal that can be perceived by a user. The signal can be perceptible in the vicinity of the container 1. Alternatively, it can be perceptible from a remote position, for example on the instrument panel of a vehicle.

When the outlet tube of the fuel delivery nozzle 4 is correctly positioned in the inlet orifice 2, it passes through the primary coil 6. This causes oscillation in a resonant circuit consisting of the primary coil 6 and a shunt capacitor.

The control and measurement electric circuit 7 determines the measured frequency $f_m$ of oscillation of the circuit of the primary coil 6.

The comparator means 11 compare the measured oscillation frequency $f_m$ with a reference oscillation frequency $f_r$. The reference oscillation frequency $f_r$ is the oscillation frequency of the primary circuit 6 in the presence of the outlet tube of the fluid delivery nozzle adapted to deliver suitable fluid to the container 1.

In the event of a difference between the frequencies $f_r$ and $f_m$, the alarm means 12 warn the users of the mistake they are about to make by sound or light means.

Figure 2:
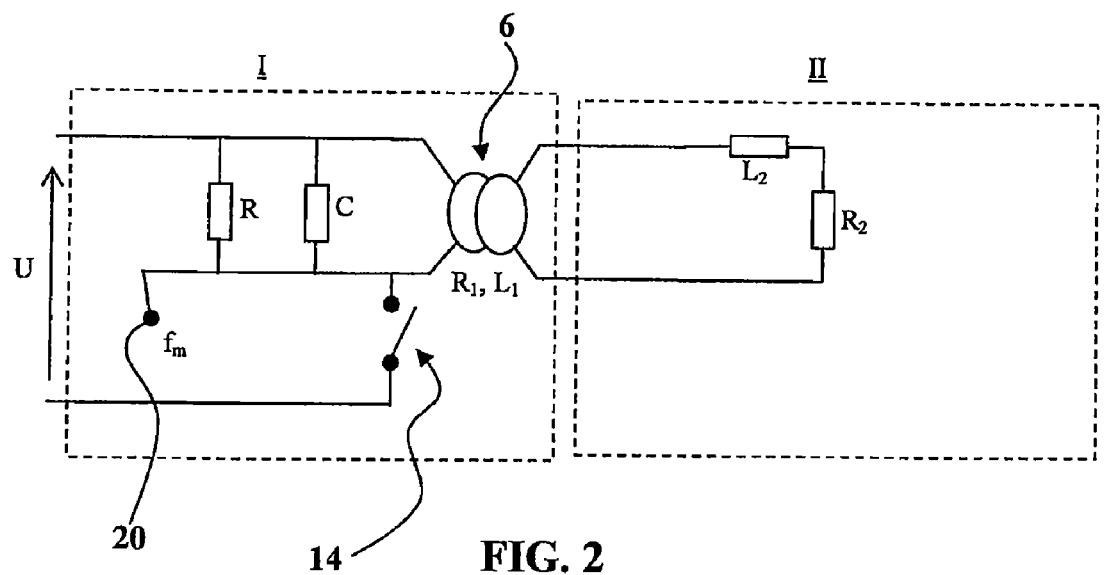
FIG. 2 is an equivalent circuit diagram of the FIG. 1 device.
Figure 3:
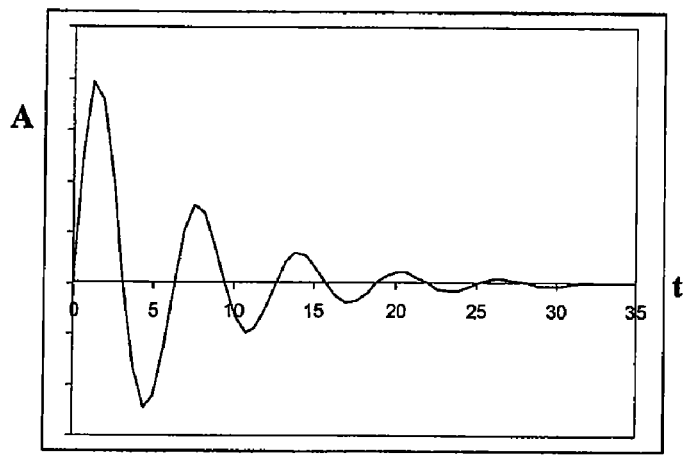
FIG. 3 represents the waveform of the current or the voltage at the oscillation frequency $f_m$ in the primary circuit from FIG. 1.

FIGS. 2 and 3 show the structure and the operation of the FIG. 1 device in more detail. FIG. 2 is an equivalent circuit diagram of the FIG. 1 device.

The primary circuit I comprises the primary coil 6, which has an inherent inductance $L_1$ and an inherent resistance $R_1$. A capacitor C is connected in parallel with the primary coil 6. The combination is supplied with power by a DC generator U via an excitation switch 14 in the control and measurement circuit 7. The excitation switch 14 makes and breaks the power supply connection to cause the primary circuit I to oscillate. In practice, the control and measurement electric circuit 7 can be based on a microprocessor or microcontroller associated with a stored program. The program contains a sequence for recognizing the outlet tube of the delivery nozzle during which the microcontroller commands closing and then opening of the excitation switch 14 and then looks for the reception of a voltage signal at the measurement point 20 to determine its measurement frequency $f_m$.

The voltage signal at the measurement point 20 is measured after opening of the excitation switch 14. It is therefore the voltage across the primary winding 6. The voltage signal is an oscillatory signal and is fed to the measurement electric circuit 7 to determine the measurement frequency $f_m$.

A secondary circuit II consists of the outlet tube 4b of the delivery nozzle 4. The secondary circuit II is schematically represented by an equivalent inductance $L_2$ and an equivalent resistance $R_2$ in series.

FIG. 3 represents the waveform of the voltage measured at the measurement point 20 (FIG. 2) or the amplitude A of the voltage as a function of time t. Analyzing this signal determines the oscillation frequency $f_m$ of the circuit.

Notice significant damping of the signal in FIG. 3.

Figure 4:
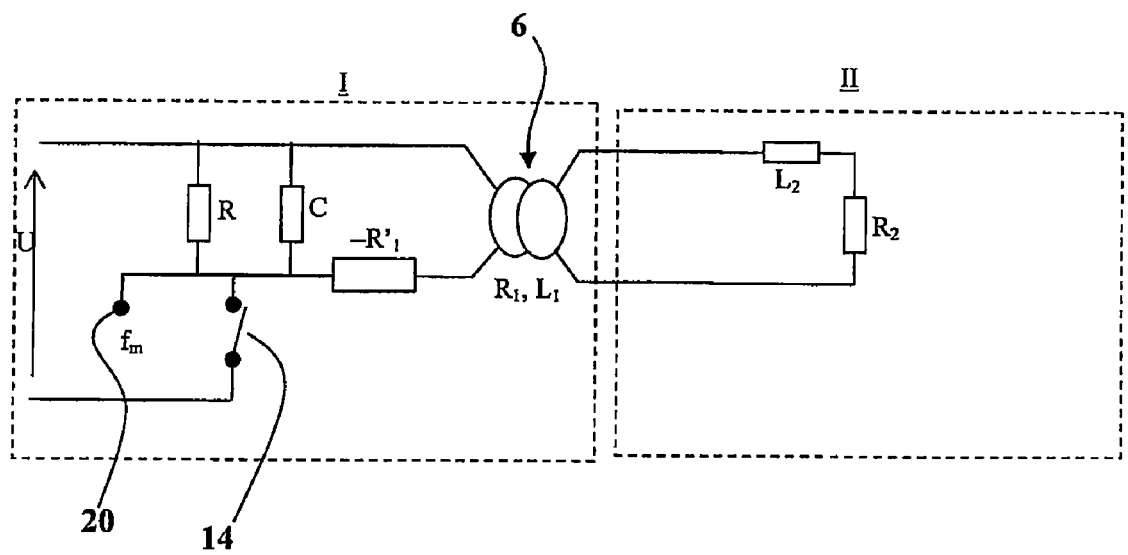
FIG. 4 is an equivalent circuit diagram of a second embodiment of the FIG. 1 device.

FIG. 4 is an equivalent circuit diagram of a device from FIG. 1 improved to reduce the damping of the signal. The same essential means are identified by the same reference numbers as in FIG. 2.

To alleviate the damping of the signal shown in FIG. 3, a negative resistance $-R'_1$ is added, as shown in FIG. 4. The negative resistance $-R'_1$, can be constructed with the aid of an operational amplifier. $R'_1$, is chosen so that $R'_1 \sim R_1$. The frequency measurement is then more precise.

To validate the solution according to the invention, the various parameters of an equivalent circuit of the FIG. 1 device and the frequencies of the signal were measured, firstly in the presence of a petrol delivery nozzle outlet tube, secondly in the presence of a diesel delivery nozzle outlet tube, and finally with no delivery nozzle outlet tube. A number of delivery nozzles of each type were tested. The measured values were as follows:

R=6 200Ω
C=22 nF
inside diameter of coil 6=35 mm
length of coil 6=6 mm
$R_1$=33Ω
$L_1$=1.29 mH.

In the absence of a delivery nozzle outlet tube, the frequency $f_m$ was between 19.9 and 20 kHz.

In the presence of petrol delivery nozzle outlet tubes, the frequency $f_m$ was between 20.6 and 20.8 kHz.

In the presence of diesel delivery nozzle outlet tubes, the frequency $f_m$ was between 21.1 and 21.4 kHz.

These tests demonstrate the possibility of deciding between the two types of delivery nozzle tested, a non-metal tube, and no tube.

The embodiment of FIGS. 1 to 4 is suitable in particular for adaptation of the invention to new vehicles, during construction thereof. There can then be prior provision for adaptation of the primary coil 6 to the guide tube 9c before it is introduced into the inlet pipe. In practice, the primary coil 6 can be molded into the wall of the guide tube 9c, which is itself made from plastic material. Alternatively, it can be molded over with a plastic material around the guide tube 9c.

In another embodiment, the invention provides for adaptation to existing vehicles, in which it is no longer possible to integrate the primary coil 6 into the guide 9 and supply it with power there.

Figure 6:
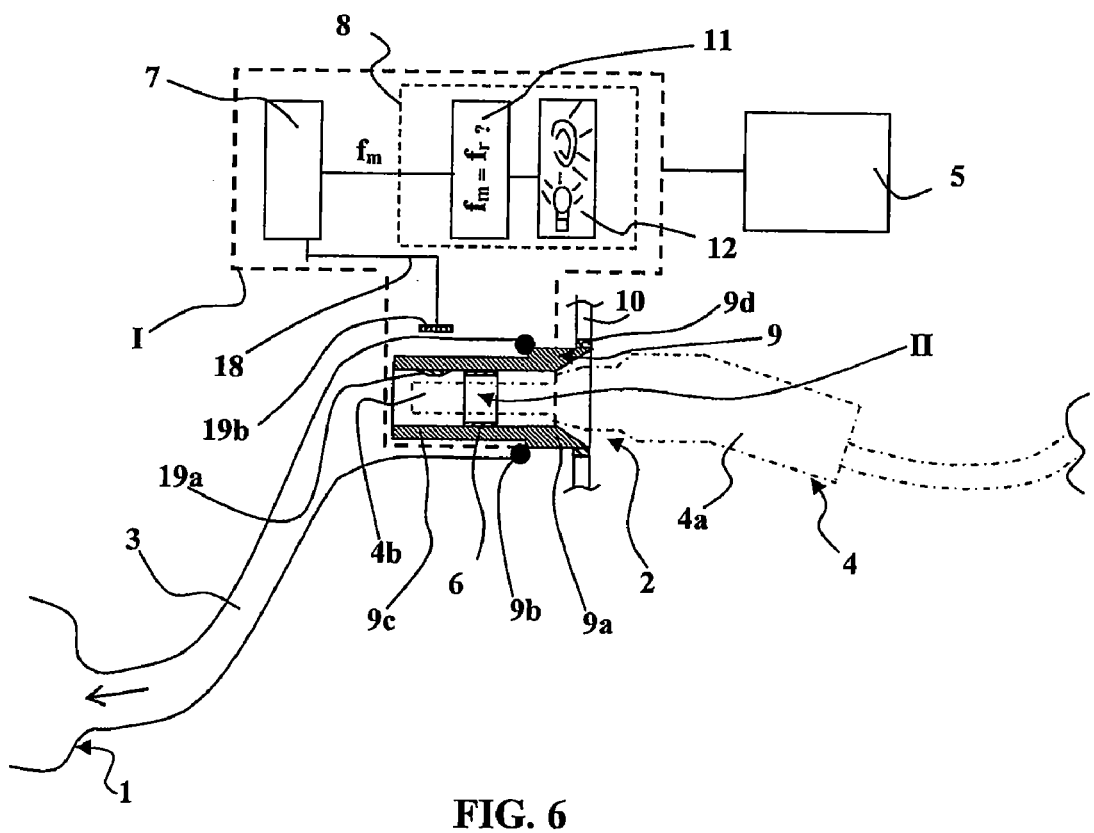
FIG. 6 is an overview of a second embodiment of the delivery control device of the invention, using inductive coupling.
Figure 7:
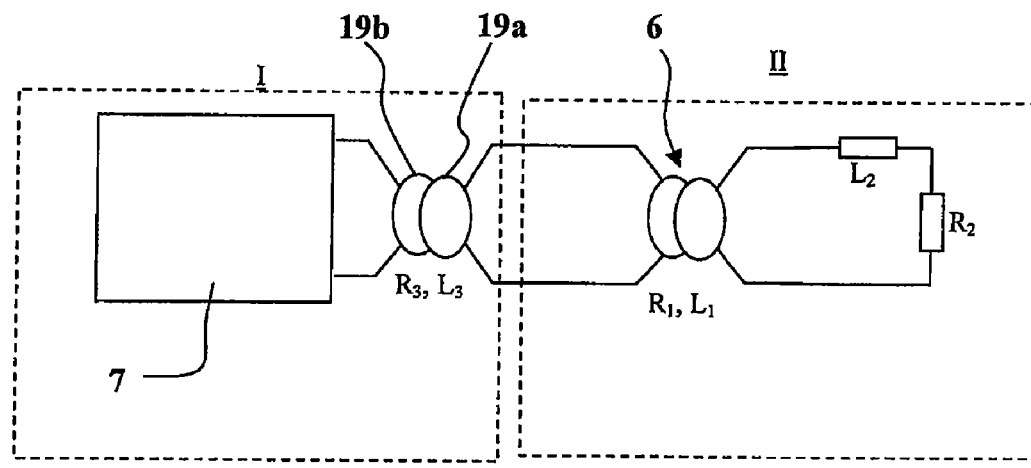
FIG. 7 is an equivalent circuit diagram of the FIG. 6 device.

Consider now FIGS. 6 and 7.

In the embodiment shown in FIG. 6, the essential means of the device shown in FIG. 1 are seen again, and these essential means are identified by the same reference numbers.

The difference is in how power is supplied to the primary coil 6 and in its position.

In this case, the primary coil 6 is again oriented coaxially and placed in the vicinity of the fluid inlet orifice 2. It is engaged coaxially inside the guide tube 9c and has a tubular shape and a small thickness to leave sufficient space for the outlet tube 4b of the delivery nozzle 4 to pass through.

The primary coil 6 is supplied with power from the control and measurement circuit 7 via a receiver coil 19a and a sender coil 19b. The receiver coil 19a is connected in series with the primary coil 6 and is also housed inside the guide tube 9c, oriented radially, curved in shape and sufficiently thin to leave room for the outlet tube 4b of the delivery nozzle 4 to pass. The sender coil 19b is placed outside the inlet pipe 3 which is itself made of plastic material and is connected to the control and measurement electric circuit 7. The sender coil 19b and the receiver coil 19a are coupled magnetically to each other through the plastic material wall of the inlet pipe 3 and through the plastic material wall of the guide tube 9c.

The primary coil 6 and the receiver coil 19a form a tubular assembly, advantageously embedded in a plastic material, and introduced axially into the guide tube 9c.

FIG. 7 is an equivalent circuit diagram of the circuit from FIG. 6, in which the components are identified by the same reference numbers.

It is clear that, in this embodiment, the device can be fitted to a vehicle without separating the guide 9 and the inlet pipe 3. The assembly formed by the primary coil 6 and the receiver coil 19a, being embedded in a plastic material, also avoids any contact between conductors and the atmosphere inside the inlet pipe 3.

Figure 8:
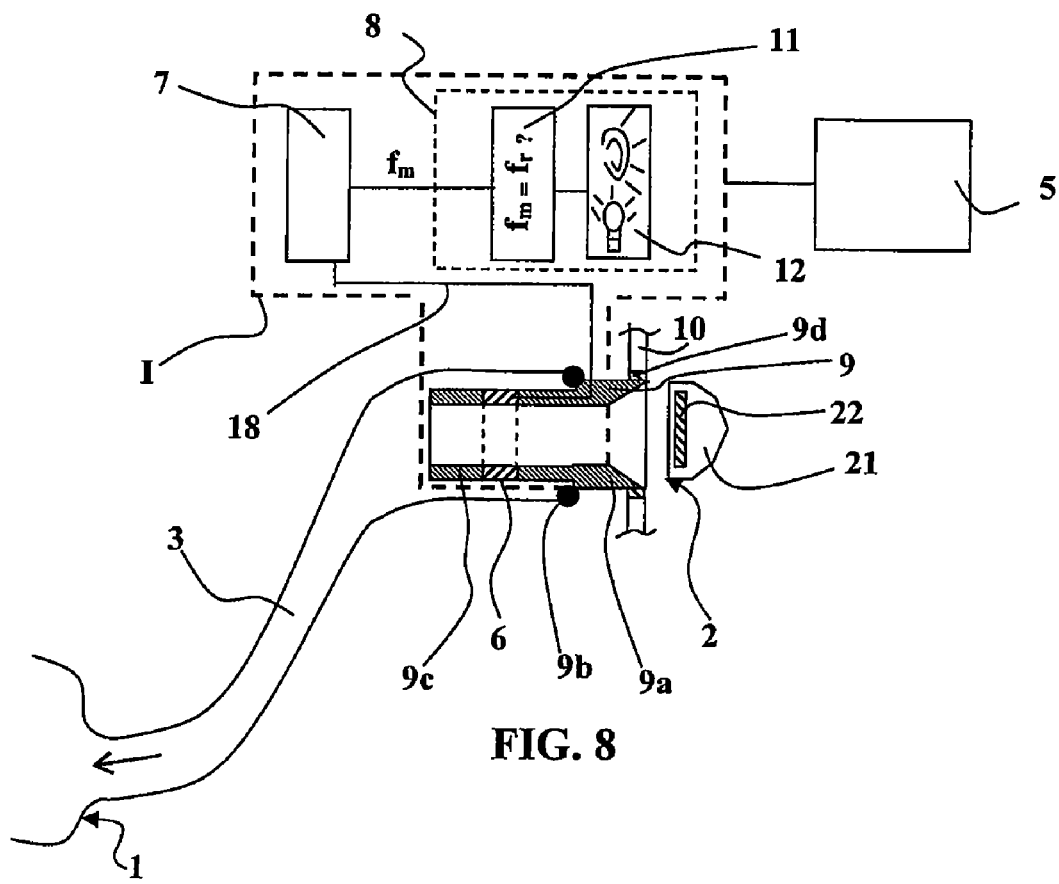
FIG. 8 is an overview of a third embodiment of a device, using cap detection.
Figure 9:
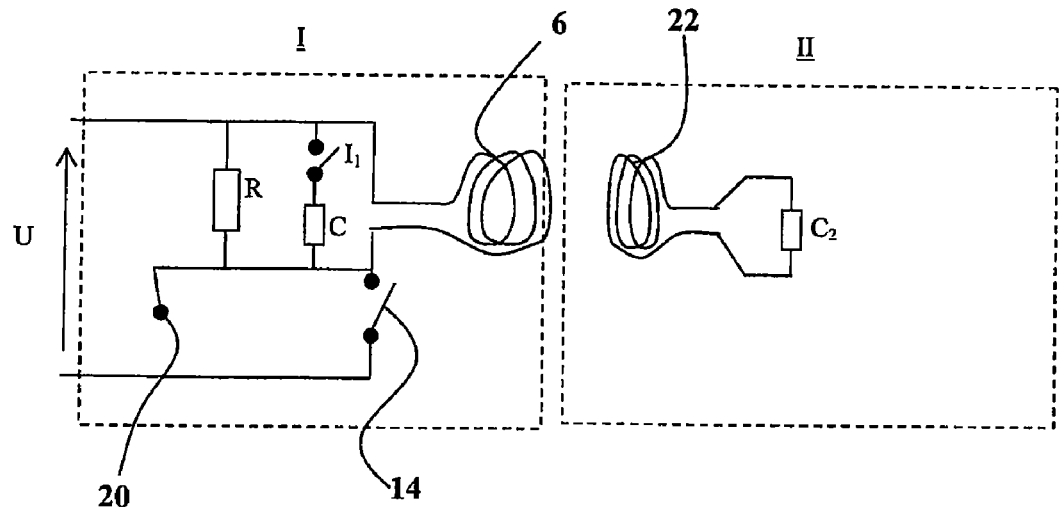
FIG. 9 is an equivalent circuit diagram of the FIG. 8 device.

FIGS. 8 and 9 show a more complete embodiment, which adopts the essential means of the FIG. 1 embodiment and the FIG. 2 embodiment, adding thereto means for detecting the presence of a cap adapted to block the inlet orifice 2.

FIG. 8 therefore shows the inlet orifice 2 formed by the guide 9, with the primary coil 6 and the means for supplying it with power and the means for processing signals that it produces.

The difference is the presence of the cap 21, into which are integrated a secondary coil 22 and a secondary capacitor (not shown in the figure) connected in series with each other.

Refer now to FIG. 9, which shows the equivalent circuit diagram of the FIG. 8 device in more detail.

A secondary circuit II is formed by the secondary coil 22 and the secondary capacitor C2. Note the primary coil 6, the capacitor C with which it forms a resonant circuit during delivery nozzle detection sequences, and the resistor R.

In this embodiment, the capacitor C is in series with a test switch I1, the combination with the primary coil 6 and the resistor R being connected in series with the excitation switch 14 and a DC voltage source U such as a vehicle battery.

There is provided in the control and measurement electric circuit 7 a cap verification program sequence during which the microcontroller causes the test switch I1 to be opened, after which it causes the excitation switch 14 to be closed and then opened. The program sequence also comprises a measurement sequence during which the microcontroller looks for reception of a voltage signal at the measurement point 20 after opening of the main switch 14.

In this case, in the presence of a cap 21, the opening of the excitation switch 14 causes a voltage pulse to appear at the terminals of the primary coil 6, which pulse itself generates an electromagnetic pulse transmitted to the secondary coil 22. The resonant circuit formed by the secondary coil 22 and the secondary capacitor C2 then begins to oscillate, which oscillation is transmitted to the primary coil 6 which itself transmits it to the control and measurement electric circuit 7.

In the absence of a cap 21, opening the excitation switch 14 does not generate any oscillation in the electric circuits, and this information is transmitted to the control and measurement circuit 7.

During a cap presence verification sequence, the control and measurement circuit 7 can therefore emit a cap presence signal on reception at its input of an oscillatory signal after opening of the main switch 14 or a cap absence signal on reception at its input of a non-oscillatory signal.

A cap presence detection sequence can be provided both in applications to vehicles and in applications to other types of container.

In the case of an application to vehicles, a cap presence verification sequence can be activated on starting the vehicle or when it begins to move. The control and measurement circuit 7 is then also supplied with power by a positive voltage source after the vehicle ignition is turned on, independently of the position of the flap if there is one. A warning can then be emitted inside the vehicle if there is no cap.

A cap presence verification sequence can also be activated on closing the flap if the flap position sensor, if any, can be short-circuited by a vehicle power supply (+BATT) back-up unit with a time-delay. The warning message can then be emitted outside the vehicle.

A delivery nozzle presence verification sequence can also be activated on switching on the ignition of the vehicle and/or starting the vehicle. A warning can then be emitted inside the vehicle in the case of presence of delivery nozzle.

The device can also be programmed to emit a vehicle starting alarm if it is still energized, i.e. if the flap is still open.

Figure 5:
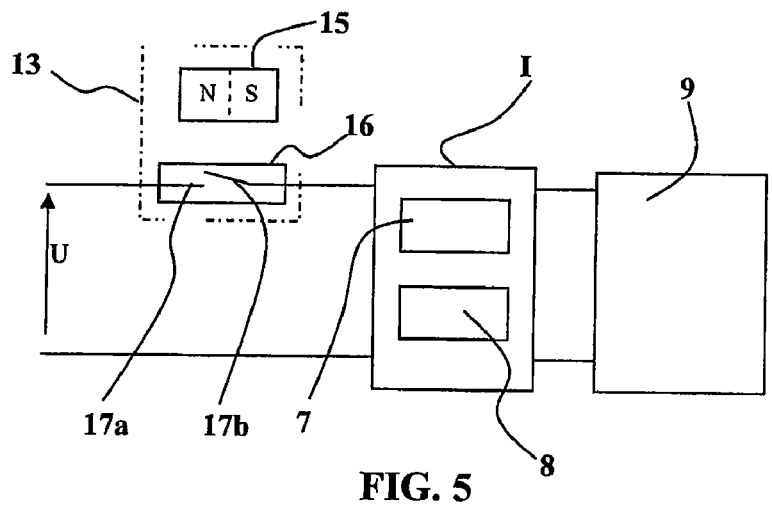
FIG. 5 is a diagram of the delivery control device in an embodiment using power supply cut-off means.

FIG. 5 represents a preferred embodiment of the device from FIG. 1 or FIG. 6, improved by the addition of an input switch 13.

Vehicles comprise a tank 1 generally closed by an access flap near the inlet orifice 2.

The input switch 13 is a flap position sensor. It supplies power to the primary circuit I of the device of the invention only if the flap is open. The input switch 13 represented here is a REED switch. A REED input switch 13 of this kind includes a switch magnet 15 and a glass tube 16 containing the contacts 17a and 17b.

When the magnet of the switch 15 moves closer (on opening the flap), the magnetic flux lines cross the contacts 17a and 17b. The contact 17a becomes a north pole and the contact 17b becomes a south pole. The contacts 17a and 17b therefore move toward each other until they touch and the primary circuit I of the device of the invention is then supplied with power by the voltage generator U. The control and measurement electric circuit 7 and the detector means 8 can therefore operate.

The supply of power is interrupted as soon as the flap is closed, preventing any unnecessary consumption of electrical energy.

On opening the flap, as soon as the input switch 13 switches over, the control and measurement circuit 7 is supplied with power. The control and measurement circuit 7 can then immediately undertake a delivery nozzle presence verification sequence which, if there is no delivery nozzle 4 present, recalibrates the control and measurement electric circuit 7.

If the flap is open for a very long time (compared to the usual time to fill the container), i.e. if the input switch 13 has been switched over for a period exceeding a particular threshold, the system can switch to a "low consumption" mode by stopping excitation of the control and measurement electric circuit 7 or exciting it at very long intervals, in order not to run down the battery.

In the embodiment shown in FIGS. 10 to 17, the delivery control device of the invention also has the aim of making it impossible to fill the container 1 with an inappropriate fuel.

This embodiment includes the essential means of the preceding embodiments from FIGS. 1 to 9, and in particular the means for detecting the presence of and the type of fluid delivery nozzle 4 and the FIG. 5 means with the input switch 13 and the access flap.

What is more, the device prevents the error without generating additional risks stemming from inappropriate prohibition of access to the container.

For this purpose, access to the container 1 is blocked by a valve 23 the locking and unlocking of which are conditioned by the signal coming from the fluid delivery nozzle presence and type detector means, which are adapted to detect the outlet tube 4*b* of the delivery nozzle 4 upstream of the valve 23 in the direction of flow of the fluids toward the container 1.

The valve 23 can be moved by the action of inserting the outlet tube 4*b* of the fluid delivery nozzle 4. For this purpose, the valve 23 can be articulated to rotate about a transverse axis 23*a* situated in the upper portion of the valve 23, in the guide tube 9*c*. The valve 23 is in an intermediate position in the guide tube 9*c*.

In this embodiment, the primary coil 6 is placed in the vicinity of the inlet end of the guide tube 9*c*, upstream of the valve 23.

The device further comprises a locking actuator 24 supplied with power by the control and measurement electric circuit 7 and adapted selectively to prohibit or to authorize pivoting of the valve 23 when pushed by the outlet tube 4*b*.

Figure 10:
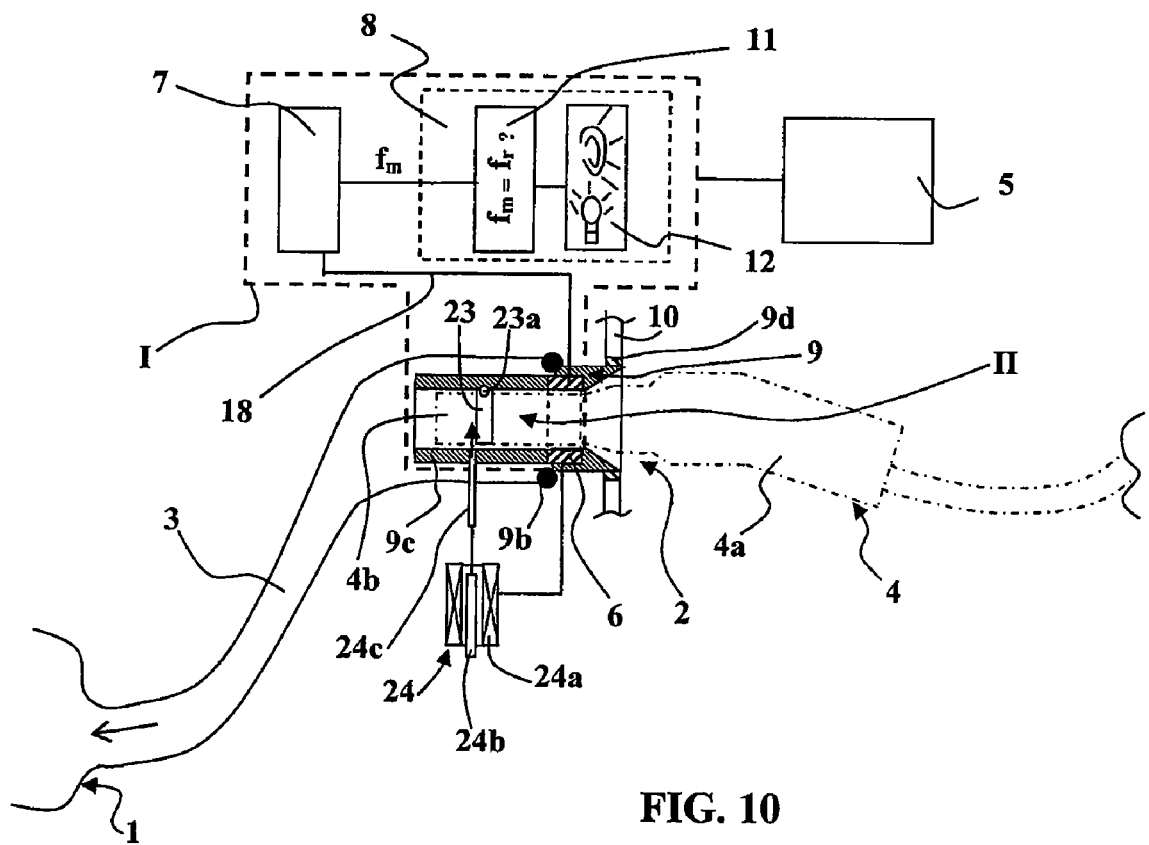
FIG. 10 is an overview of a fourth embodiment of a device using a locking device and a blocking valve in a standby unlocked position.

For example, the locking actuator 24 can comprise a solenoid 24*a* in which slides a magnetic core 24*b* fastened to a locking abutment 24*c*, with means for urging the locking abutment 24*c* and the magnetic core 24*b* into the retracted position shown in FIG. 10, for example by means of a return spring and/or by gravity.

Accordingly, in the ready position as shown in FIG. 10, the locking actuator 24 is not supplied with power, and the locking abutment 24*c* is retracted, allowing the valve 23 to pivot. The valve 23 nevertheless remains inaccessible, being covered by the closed access flap.

The locking actuator 24 is located in such a way that the locking abutment drops under its own weight in the event of failure of the return spring.

Figure 14:
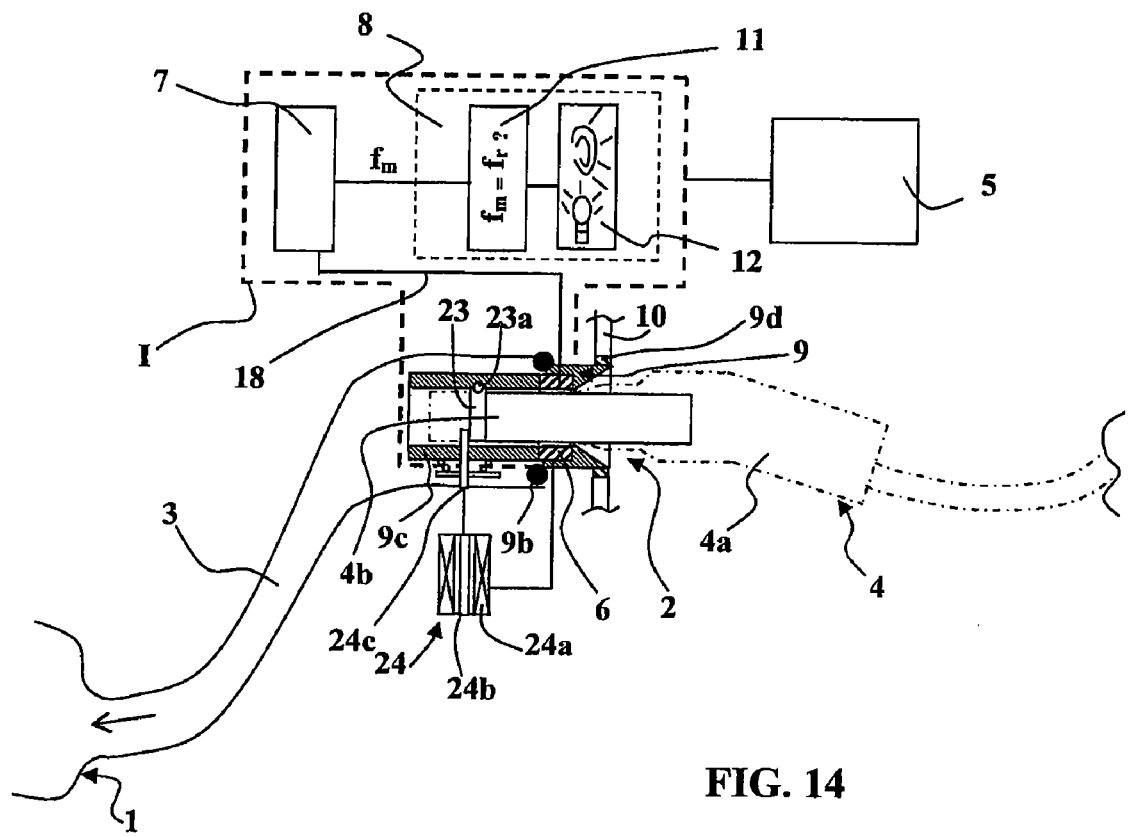
FIG. 14 shows the device from FIG. 10 when the delivery nozzle is being identified or when access has been refused.
Figure 15:
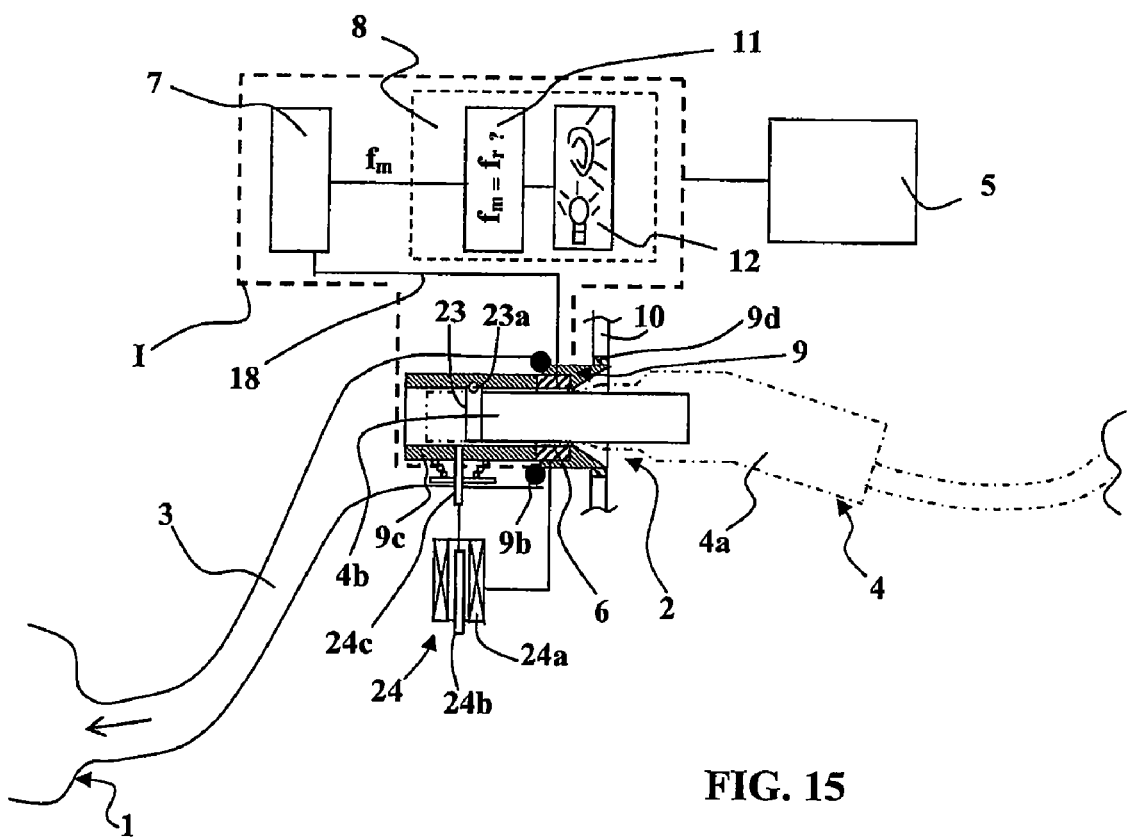
FIG. 15 shows the device from FIG. 10 when the access has been authorized.
Figure 16:
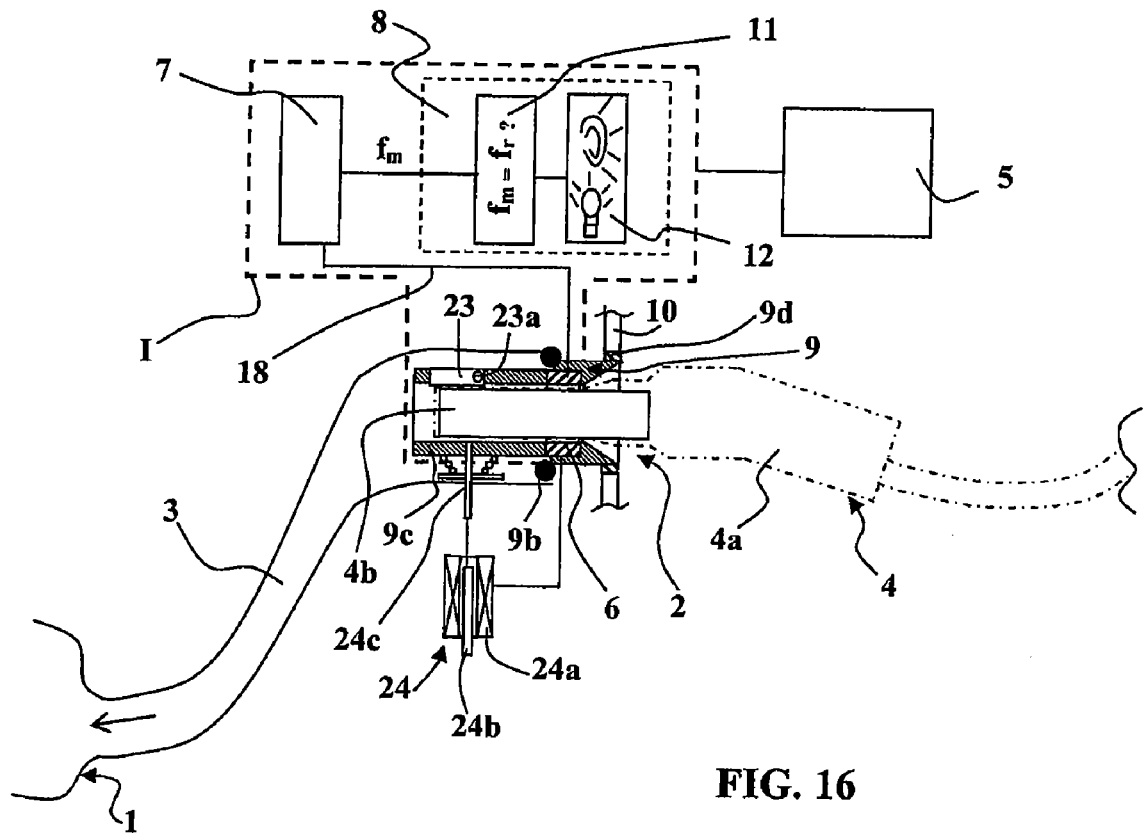
FIG. 16 shows the device from FIG. 10 when access has been authorized and following insertion of the delivery nozzle for filling.

Consider next FIGS. 14, 15 and 16, showing the steps of operation of the lockable access delivery control device from FIG. 10, in a first embodiment with conditional unlocking.

As soon as the access flap is opened, or the cap is removed, the presence detector device is supplied with power. The control and measurement electric circuit 7 causes the solenoid 24*a* to be energized to place the locking abutment 24*c* in the locking position, preventing opening of the valve 23. The locking device is then in the state shown in FIG. 14.

The user can introduce the end of the outlet tube 4*b* into the first part of the guide tube 9*c*, upstream of the valve 23. Because of the position of the primary coil 6 upstream of the valve 23, the outlet tube 4*b* passes through it. The detector device can then detect the presence of the delivery nozzle and determine the type of delivery nozzle.

If an inappropriate delivery nozzle is detected, it cannot penetrate beyond the valve 23, which remains in the locked position.

The valve 23 can be of the sealed type, completely blocking the inlet orifice 2 when it is closed, in order to expel any liquid that one might nevertheless seek to introduce via a delivery nozzle left partially inserted.

Alternatively, the valve 23 can be of an external covering ring type, adapted to block only an end of filling detector device of a delivery nozzle equipped with such a device. This end of filling detector device comprises an interior tube leading to a sensor that is responsive to the liquid pressure in the end region of the delivery nozzle, closing the delivery nozzle if the liquid is expelled into the detector tube. As a result, filling by an inappropriate delivery nozzle is also interrupted. Filling nevertheless remains possible using a delivery nozzle with no end of filling detector device or a delivery nozzle that has been pulled back upstream of the coil, or by a nonstandard device such as a jerrycan.

If an appropriate delivery nozzle is not detected or the flap is not closed or the cap is not replaced, this locked state is maintained.

In FIG. 15, an appropriate delivery nozzle has been detected. In this case, the control and measurement electric circuit 7 disconnects the power supply from the solenoid 24*a* and the locking abutment 24*c* drops into the retracted position. The valve 23 can then pivot when pushed in the axial direction by the outlet tube 4*b*. The state shown in FIG. 16 is then reached, in which the outlet tube 4*b* has penetrated beyond the valve 23, for the fluid to penetrate into the container 1.

In the embodiment that has just been described, filling is prevented by defect: when the flap is opened, the device is put at the locked state; when the detected delivery nozzle is correct, the valve is unlocked and the filling is authorized.

The opposite logic can be more favorable. In that case, by defect, filling is authorized; when a delivery nozzle is detected that does not have the appropriate shape or structure corresponding to the chosen fuel, access for filling is locked.

The interest of this opposite logic can be to avoid operation of the electromechanical locking system when all is normal, i.e. when the delivery nozzle presents the appropriate shape corresponding to the chosen fuel. Indeed, the operation of such an electromechanical system always produces a noise and/or a delay of operation, which gives the user an impression of abnormal operation or too slow system.

The opposite logic, which authorizes the filling by defect, is however more complex to implement, because it is necessary to react quickly to lock the access before the delivery nozzle reaches the valve.

In addition, when a delivery nozzle is slowly approaching the mouth of filling, the influence thereof on the electromagnetic waves increases progressively as it approaches. In the same way, the analysis of the signals shows a variation of the frequency which increases progressively with the approach. The frequency is stabilized finally when the delivery nozzle runs through the solenoid of measurement. However, in a stabilized state, a diesel delivery nozzle causes a variation of frequency stronger than a petrol delivery nozzle. Consequently, in the case of opposite logic, when a diesel delivery nozzle is slowly approached, before the stabilization of the signal, the system can believe to recognize a petrol delivery nozzle. As the system must react quickly, it orders the locking of the access. When the delivery nozzle continues the advance, the system recognizes finally the diesel delivery nozzle, and unlocks the access. During operation, there thus was an error of diagnosis, which causes the abnormal operation of the system, with the disadvantages mentioned previously of the first logic.

Figure 18:
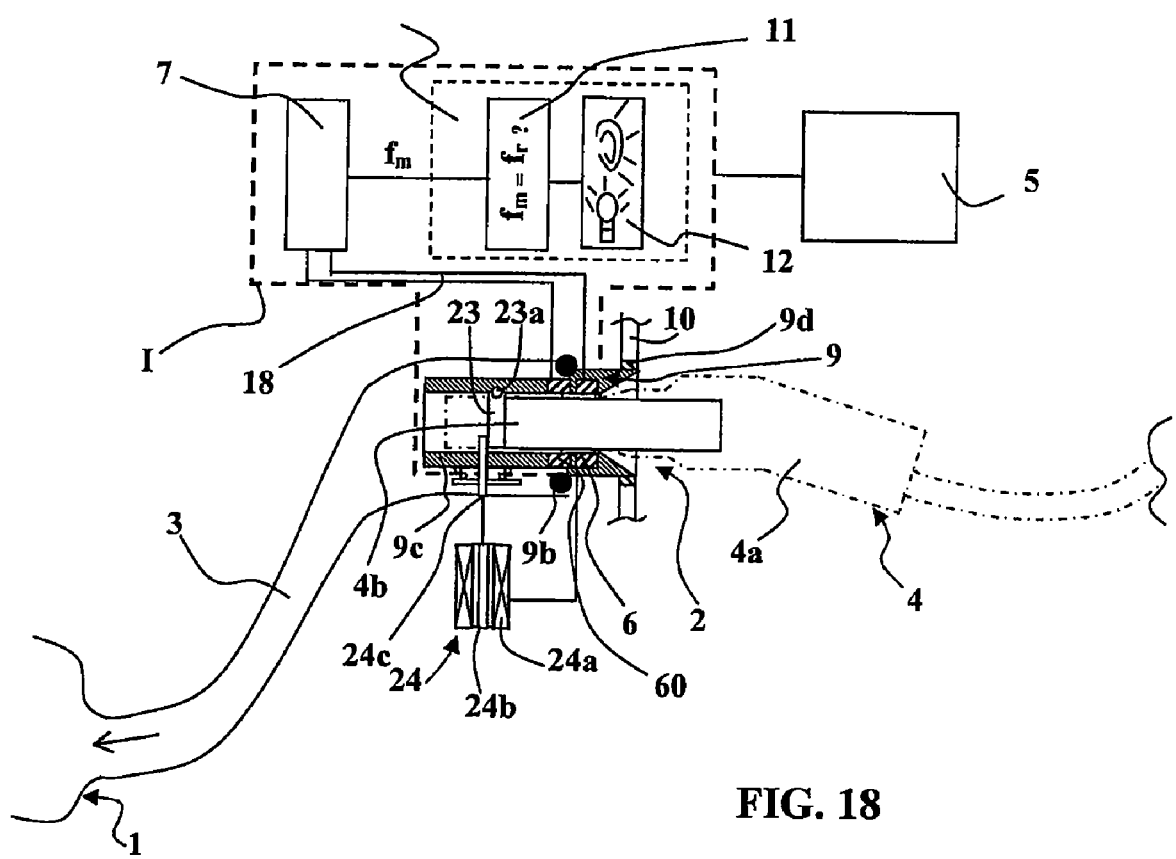
FIG. 18 shows another embodiment comprising means to make reliable the identification of the delivery nozzle.

To solve this problem, means can be provided to make reliable the identification of the delivery nozzle, for example as shown on FIG. 18.

For that purpose, a second primary coil 60 is added, fixed at the container 1, 3, in the vicinity and downstream from the primary coil 6, to be crossed by the outlet tube 4*b* of the fluid delivery nozzle 4 at the time of its introduction into the fluid delivery orifice 2. The second primary coil 60 is fed by the control and measurement electric circuit 7 in the same way that the primary coil 6, in order to generate electromagnetic waves in the inner space of the second primary coil 60. In the control and measurement electric circuit 7, means of detection, sensitive to the waveform of currents or voltages which appear in the second primary coil 60, make it possible to distinguish, according to the waveform of currents or voltages in the second primary coil 60, the presence of a fluid delivery nozzle 4.

When the second primary coil 60 thus detects the presence of the outlet tube 4b, the detector means 8 enable the detection made by the primary coil 6, and this guarantees that the delivery nozzle is sufficiently introduced into the primary coil 6 so that the latter determines in a positive way which is the type of the delivery nozzle. The detection of the type of the delivery nozzle is thus made reliable, to produce locking only if the delivery nozzle does not correspond to the chosen type of fuel.

But a difficulty is that this embodiment can potentially leave a possible access to a very fast user, if the time for the delivery nozzle to pass through from the second primary coil 60 to the valve 23, is less than the time for treating the signals by electronics and for the locking actuator 24 to respond.

It is thus desirable to provide an audible or luminous means of warning for the user at the time of the very fast introduction of a delivery nozzle not corresponding to the chosen fuel. By example, one can feed the coils by an electrical current at audio frequencies, for example at two tonalities of 5 kHz and 2 kHz, at the time of the detection of an inappropriate delivery nozzle.

Thus, the system is completely quiet as long as the operation is normal, i.e. as long as a normal delivery nozzle is introduced, and the system generates audible vibrations in the event of a very fast introduction of an abnormal delivery nozzle.

According to the invention, the detector device detects the type of delivery nozzle 4 without physical contact with the outlet tube 4b, and the signals produced drive the locking actuator 24 to prevent penetration of the outlet tube 4b if the tube does not have the appropriate shape or structure corresponding to the chosen fuel.

Figure 17:
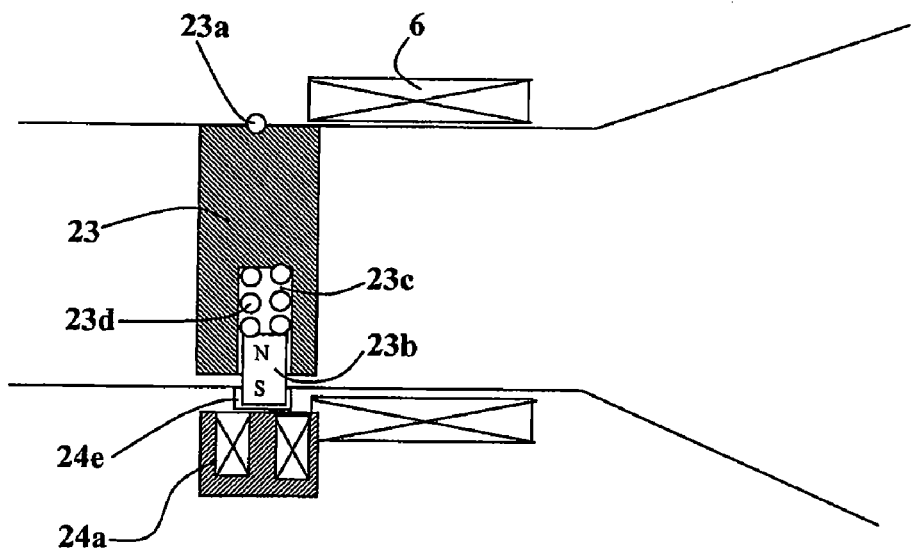
FIG. 17 shows a variant of the FIG. 10 device in which locking is produced by a sliding magnet.

FIG. 17 shows a variant of the locking type delivery control device.

The valve 23 carries a permanent magnet 23b, engaged in an open housing 23c facing the solenoid 24a, and withdrawn into the housing 23c by an unlocking spring 23d. Energizing the solenoid 24a attracts the magnet 23b which exits the housing 23c and enters a corresponding housing 24e of the guide tube 9c to lock the valve 23. Unlocking is effected by disconnecting the power supply from the solenoid 24a.

The solenoid 24a and the primary coil 6 can be supplied with power in series. In this case, a high current can drive the solenoid 24a for locking and a lower current can suffice to drive the delivery nozzle tube recognition device. The aim is to limit the number of interconnecting wires and control components.

In a locking type delivery control device, the control and measurement electric circuit 7 can advantageously contain a stored program including a sequence for verifying the presence and the nature of the fluid delivery means that command locking of the locking device 23, 24 if the fluid delivery means do not have one of the authorized structures defined by parameters stored in a memory of the control and measurement electric circuit 7.

The information indicating the presence of the outlet tube 4b generated by the detector device can be stored in an appropriate memory.

Thus a record of entry of outlet tubes into the device can be kept, for example to verify that the engine has always been fuelled correctly and that an engine fault cannot be the result of incorrect fuelling, which would void the manufacturer's warranty.

This information can also be used to manage abnormal usage, for example forgetting to close the flap, forgetting to replace the cap, illegitimate or suspect access, or even forgetting to remove the delivery nozzle.

The control and measurement electric circuit 7 can contain a stored program with an algorithm for measuring the duration for which the fluid delivery means are present. The result of this measuring can be communicated to a processor onboard the vehicle having a filling level indication function.

The result of this measuring can then be used to reset to a correct value the full tank indication given by the onboard processor: a delivery nozzle present for a significant time can be interpreted as an assurance that the tank has been filled correctly.

This procedure reduces errors in the fuel level indication. In fact, the fuel level information is affected by a nose-up or nose-down position of the vehicle. A nose-up or nose-down position generates fuel level errors, and can apply briefly (traveling on a slope) or for a longer period (parking on a slope). Algorithms are available in the onboard processor for minimizing these errors. However, these algorithms can cause a fuel level display error immediately after filling up. This inconsistent information is an irritation for the customer.

Using the result of measuring information, starting from the principle that fuel pumps are not on a slope, the information from the fuel level sensor can be taken as totally reliable on starting the vehicle, and for example indicate "full" whereas the original algorithm would have indicated "almost full". The processor therefore gives a "full" level indication serving as a reference if the result of the measuring exceeds a predefined duration.

The invention seeks to avoid immobilization of terrestrial vehicles with an internal combustion engine.

A first immobilization situation could be an error of the electronic device, failing to detect the presence of a valid delivery nozzle.

To prevent immobilization, a device can then be provided to force the "flap open" indication to "flap closed". The locking system, which is not supplied with power, is in the unlocked state. All fluid delivery devices, including non-standard devices, can be introduced and deliver a fluid into the container 1. Surveillance by the device is no longer provided, but the vehicle is not immobilized. Another possible drawback of this strategy is that there is no record of illegitimate access by undesired fluid sources.

Another solution for preventing possible immobilization of the vehicle is to allow incomplete opening of the flap, avoiding activation of the measurement device, and introduction of a filler tube. Once the filler tube has been introduced, the valve 23 is pushed back and the user can open the flap completely. The system can then store the presence of the tube that has been introduced.

Another way to avoid possible immobilization of the vehicle is to provide an additional device such as an additional switch, a mechanical unlocking latch, freeing access and able to be stored.

Another way is to provide a particular protocol for multiple opening/closing of the flap or offering up of the delivery nozzle, freeing access and able to be stored. In this case, it may be necessary to back up the power supply as described above.

Another possibility is to provide a time-delay: if the flap has been open for a long time, free access is systematically allowed.

A second risk of possible immobilization of the vehicle is the result of a situation in which the locking actuator 24 is commanded permanently by the control and measurement electric circuit 7 when the flap is open.

For reasons of fire prevention, it is then necessary to protect the locking actuator 24 against overheating. Such overheating can be linked to failure of the locking actuator 24 or to a command maintained for an abnormally long time. A bimetallic strip or a component with a high positive temperature coefficient (PTC) type thermal cut-out system can be used for this. This system can be rated so that a permanent command that cannot be interrupted by one of the electronic devices is in the end eliminated following reasonable heating of the actuator.

A third possibility of immobilization of the vehicle can be jamming of the mobile assembly (magnetic core 24b and locking abutment 24c). Although this situation is also highly improbable, it is possible to provide a device for manually unlocking access to the container 1.

FIGS. 11 to 13 show one embodiment of this kind of manual unlocking device: an unlocking finger 24d, accessible to the user from outside through the guide tube 9c, by transverse manual pushing, lowers the locking abutment 24c and therefore physically releases the valve 23.

Alternatively, in another embodiment, a manual unlocking device can comprise a return spring device, for example integrated into the flap, and enabling an operation by the user to interrupt the supply of power to the control and measurement electric circuit 7, for example by moving the magnet 15 away from the REED switch 16 (FIG. 5) or generally by separating two connecting elements. As a result, the "flap open" indication is forced to "flap closed", which unlocks the valve 23 by cutting off the power supply from the control and measurement electric circuit 7 and lowers the locking abutment 24c.

The present invention is not limited to the embodiments explicitly described but includes variants and generalizations thereof within the scope of the following claims.

The invention claimed is:

1. A delivery control device for preventing errors in the choice of the fluid when delivering fluid to a container by means of a fluid delivery nozzle, the nozzle having an outlet tube that is introduced into a fluid delivery orifice of the container, the structure of the outlet tube being a specific function of the fluid delivered, comprising:
    a primary coil, fixed to the container in the vicinity of the fluid delivery orifice so that the outlet tube of the fluid delivery nozzle passes through it on its introduction into the fluid delivery orifice,
    a control and measurement electric circuit adapted to supply the primary coil with power so as to generate electromagnetic waves in the space inside the primary coil,
    detector means sensitive to the waveform of the currents or voltages that appear in the primary coil that distinguish the presence and the type of fluid delivery nozzle as a function of said waveform of the currents or voltages in the primary coil.

2. The device according to claim 1, comprising a capacitor connected in parallel with the primary coil, this combination being connected in series with an excitation switch to be supplied with power by a DC voltage generator.

3. The device according to claim 2, wherein the control and measurement circuit is adapted to measure the frequency of oscillation of the voltage at the terminals of the primary coil after opening of the excitation switch to produce a measured frequency signal.

4. The device according to claim 3, wherein the detector means comprise:
    comparator means for receiving the measured frequency signal and for comparing the measured frequency signal with a reference frequency signal specific to the type of fluid delivery nozzle adapted to deliver the fluid that is suitable for the container and to produce an error signal in the event of a significant difference between the measured frequency signal and the reference frequency signal,
    alarm means for attracting the attention of the user in the case of the presence of an error signal.

5. The device according to claim 1, wherein:
    it comprises a capacitor connected in parallel with the primary coil, this combination being connected in series with an excitation switch to be supplied with power by a DC voltage generator,
    the capacitor is itself connected in series with a test switch,
    a secondary resonant circuit is provided in a cap for blocking the delivery orifice,
    the control and measurement circuit contains a cap presence control sequence during which the test switch is open and the control and measurement circuit commands the closing and then the opening of the excitation switch and then the reception and analysis of the voltage signal at a measurement point and the generation of a cap presence signal in the case of reception of an oscillatory signal and the generation of a cap absence signal in the case of reception of a non-oscillatory signal.

6. The device according to claim 1, comprising a locking device positioned downstream of the primary coil and adapted selectively to oppose movement of the outlet tube towards the container and/or flow of the fluid toward the container.

7. The device according to claim 6, wherein the locking device comprises:
    a blocking valve adapted selectively to assume a blocking state in which it blocks access to the container and a release state,
    a locking actuator driven by the control and measurement electric circuit, acted on by return means, the locking actuator being adapted to assume a locked state or an unlocked state,
    the locking actuator holding the blocking valve in the blocking state when it is itself in the locked state and allowing the blocking valve to assume the release state when it is itself in the unlocked state.

8. A device according to claim 7, wherein return spring means urge the locking actuator toward its unlocked state, and/or the locking actuator is located so as to return to the unlocked state under its own weight.

9. The device according to claim 7, wherein the valve is of sealed type, completely blocking the fluid delivery orifice when it is closed.

10. The device according to claim 6, comprising a device for manually unlocking access to the container.

11. The device according to claim 10, wherein the manual unlocking device comprises an unlocking finger accessible to the user from the outside through the guide tube and used to lower the locking abutment.

12. The device according to claim 10, characterized in that the manual unlocking device comprises a return spring device enabling action of the user to interrupt the supply of power to the control and measurement electric circuit.

13. The device according to claim 6, wherein the control and measurement electric circuit contains a stored program having a sequence for verifying the presence and the nature of the fluid delivery means that commands locking of the locking device if the fluid delivery means do not have one of the authorized structures defined by parameters stored in a memory of the control and measurement circuit.

14. The device according to claim 13, wherein the stored program contains an algorithm for measuring the duration for which the fluid delivery means are present, the result of the measuring being communicated to a processor having a filling level indication function, the processor giving a "full" level indication serving as a reference if the result of the measuring exceeds a predefined duration.

15. The device according to claim 6, wherein:
   it comprises a second primary coil, fixed to the container in the vicinity of and downstream from the primary coil, to be crossed by the outlet tube,
   the control and measurement electronic circuit feeds the second primary coil in the same way as the primary coil,
   the detector means are sensitive to the waveform of currents or voltages that appear in the second primary coil and make it possible to distinguish the presence of a fluid delivery nozzle,
   when the second primary coil detects the presence of the fluid delivery nozzle, the detector means enable the detection made by the primary coil.

16. The device according to claim 1, comprising an input switch connected in series in the power supply of the primary electric circuit and adapted to switch to supply power to the control and measurement electric circuit as a function of the position of an external member such as an access flap to the fluid delivery orifice, and wherein, when the input switch changes state, the control and measurement electric circuit immediately undertakes a sequence for verifying the presence of the delivery nozzle which, if the delivery nozzle is absent, recalibrates the control and measurement electric circuit.

17. The vehicle having a device according to claim 16, wherein the control and measurement electric circuit is programmed to emit an alarm on starting the vehicle if it is still supplied with power, the flap having remained open.

18. A vehicle comprising, at the inlet orifice of its fuel tank, a device according to claim 1.

19. The vehicle according to claim 18, wherein the primary coil is oriented coaxially and molded over with a plastic material in or on the wall of a guide tube and is supplied with power from the control and measurement electric circuit via electric conductors buried in the plastic material in or on the wall of the guide tube.

20. The vehicle according to claim 18, wherein the control and measurement electric circuit contains a stored program having a sequence for verifying the presence of the delivery nozzle that is activated on turning on the ignition and/or starting the vehicle and that generates an alarm in the event of presence of the delivery nozzle.

21. The vehicle according to claim 18, comprising an appropriate memory in which the information indicating presence of the outlet tube is stored.

22. A vehicle comprising:
   a capacitor connected in parallel with a primary coil, this combination being connected in series with an excitation switch to be supplied with power from a DC voltage generator, and the capacitor is itself connected in series with a test switch,
   a secondary resonant circuit is provided in a cap for blocking a delivery orifice, and
   a control and measurement circuit including a cap presence control sequence during which the test switch is open and the control and measurement circuit commands the closing and then the opening of the excitation switch and then the reception and analysis of the voltage signal at a measurement point and the generation of a cap presence signal in the case of reception of an oscillatory signal and the generation of a cap absence signal in the case of reception of a non-oscillatory signal,
   wherein the cap verification sequence is activated on starting the vehicle or when it begins to move, an alarm being emitted in the event of absence of the cap.

* * * * *